United States Patent
Tan et al.

(10) Patent No.: US 9,921,692 B2
(45) Date of Patent: Mar. 20, 2018

(54) HINGED INPUT DEVICE

(71) Applicant: SYNAPTICS INCORPORATED, San Jose, CA (US)

(72) Inventors: Yeh-Cheng Tan, Taipei (TW); Su-Chuan Chiu, Taipei (TW)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 13/931,682

(22) Filed: Jun. 28, 2013

(65) Prior Publication Data
US 2014/0035866 A1 Feb. 6, 2014

Related U.S. Application Data

(60) Provisional application No. 61/679,555, filed on Aug. 3, 2012.

(51) Int. Cl.
*G06F 3/044* (2006.01)
*G06F 3/039* (2013.01)
*G06F 3/041* (2006.01)

(52) U.S. Cl.
CPC ........... *G06F 3/044* (2013.01); *G06F 3/039* (2013.01); *G06F 3/041* (2013.01)

(58) Field of Classification Search
None
See application file for complete search history.

(56) References Cited

U.S. PATENT DOCUMENTS

| | | | |
|---|---|---|---|
| 4,587,378 A | 5/1986 | Moore | |
| 5,510,824 A * | 4/1996 | Nelson | ........................ 347/239 |
| 6,281,889 B1 | 8/2001 | Chen | |
| 6,437,774 B1 * | 8/2002 | Tsuji et al. | .................... 345/173 |
| 6,504,529 B1 * | 1/2003 | Inagaki | ................. G06F 1/1616 341/20 |
| 7,466,518 B1 * | 12/2008 | Bjorstrom | ............ G11B 5/4826 360/244.5 |
| 8,294,047 B2 * | 10/2012 | Westerman | ............. G06F 3/017 178/18.01 |
| 8,966,973 B1 * | 3/2015 | Milone | ................. G01F 23/268 73/304 C |
| 2002/0021277 A1 * | 2/2002 | Kramer | ................... G06F 3/016 345/156 |
| 2002/0033795 A1 * | 3/2002 | Shahoian | .............. G06F 1/1616 345/156 |
| 2003/0141090 A1 * | 7/2003 | Kruger | ................ G02B 6/4201 174/50 |
| 2003/0206202 A1 | 11/2003 | Moriya | |

(Continued)

*Primary Examiner* — Jennifer Mehmood
*Assistant Examiner* — Parul Gupta
(74) *Attorney, Agent, or Firm* — FBFK PC (57) ABSTRACT

An input device for use with an electronic system includes a deflectable component having an input surface configured to be touched by input objects and a capacitive sensor layer configured to sense positional information of the input objects. A hinge pivotably mounts a first edge of the deflectable component to the electronic system and facilitates deflection of the deflectable component in response to force applied by an input object to the input surface. A spring mechanism is spaced apart from the hinge and configured to resiliently couple a second edge of the deflectable component to the electronic system and to provide a restoring force responsive to the applied force.

19 Claims, 7 Drawing Sheets

(56) References Cited

U.S. PATENT DOCUMENTS

| | | |
|---|---|---|
| 2006/0250377 A1 | 11/2006 | Zadesky et al. |
| 2010/0079404 A1 | 4/2010 | Degner et al. |
| 2010/0091062 A1* | 4/2010 | Sakamaki .............. B41J 11/706 347/16 |
| 2011/0096013 A1* | 4/2011 | Krumpelman .......... G06F 3/016 345/173 |
| 2013/0169424 A1* | 7/2013 | Kujawski ............ G06F 3/03543 340/407.2 |

* cited by examiner

HINGED INPUT DEVICE

PRIORITY INFORMATION

This application claims priority to U.S. Provisional Patent Application Ser. No. 61/679,555, filed Aug. 3, 2012.

TECHNICAL FIELD

This invention generally relates to electronic devices, and more specifically relates to sensor devices and using sensor devices for producing user interface inputs.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Some input devices also have the ability to detect force applied to a sensing surface in addition to determining positional information. For example, Degner U.S. Patent Application Publication No. 2010/0079404 discloses an input device having a touch-sensitive track pad capable of detecting an X-Y position of an input object proximate the track pad, as well as a movement indicator for detecting movement of the movable track pad. Thus, a user can press down and "click" the pad to simulate a button press. FIG. 3B of Degner illustrates a clickable input pad configured for uniform translation; that is, the entire input surface deflects uniformly regardless of the X-Y location of the applied force. FIGS. 3C and 5 of Degner illustrate a hinged pad which pivots about a hinge, and deflects much like an aileron or door.

Both hinged and uniform clickable pads typically employ a mechanical or electronic switch, such as a rubber domed tach switch, to detect movement of the pad to perform a button click, as well as a spring mechanism to restore the pad to its original position following a button click. A typical resilient hinge for providing the restoring force is shown in FIGS. 6 and 28 of Degner.

Presently known clickable input pads are limited in that they tend to impart tilt and flexure to the spring/hinge mechanism over a large number of cycles, resulting in fatigue and possibly failure of the spring and/or hinge. Moreover, a supplemental stiffening layer is typically needed to support the cyclic bending and restoration of glass reinforced epoxy laminate (FR4) or polyethylene terephthalate (PET) circuit boards used in presently known input devices, which increases the cost and complexity of the devices.

BRIEF SUMMARY

The embodiments of the present invention provide a device and method that facilitates improved device usability. Specifically, the device and method provide improved user interface functionality by facilitating user input with input objects using a hinged clickable pad having a restoring mechanism (spring) spaced apart from the hinge. The input device also includes a processing system and an array of sensor electrodes adapted to sense the X-Y position of objects at a sensing surface.

In an embodiment, a leaf spring is disposed at an edge of the input pad opposite the hinge. Although bending still takes place at the hinge, the leaf spring provides all or a significant portion of the restoring force, thereby reducing hinge fatigue. In response to force applied by an input object, the input pad pivots about the hinge, biasing the leaf spring and storing a return force in the leaf spring. When the applied force terminates, for example, when the user's finger lifts off the touch pad, the leaf spring restores the pad to its default (nominal) position.

In an embodiment, the hinge, stiffener plate, and spring are a made from single piece of planar material. In another embodiment, the hinge may be configured to contribute to the restoring force in addition to the leaf spring. In one embodiment, the tach switch is disposed directly on the back of the sensor circuit board.

According to various embodiments, a hinged input device is capable of simulating a button click. The button click, particularly when combined with the positional information, may be used to provide a wide range of user interface functionality and flexibility.

BRIEF DESCRIPTION OF DRAWINGS

Preferred exemplary embodiments will hereinafter be described in conjunction with the appended drawings, where like designations denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability by providing an improved hinged input pad which simulates a button press when the input pad surface is deflected downwardly by an input object. By separating or otherwise decoupling the restoring force from the hinge, for example, by placing a passive hinge along a first edge of the input pad a disposing a restoring spring proximate a second edge or segment of the input pad which is not co-extensive with the first edge, hinge fatigue may be reduced.

Figure 1:
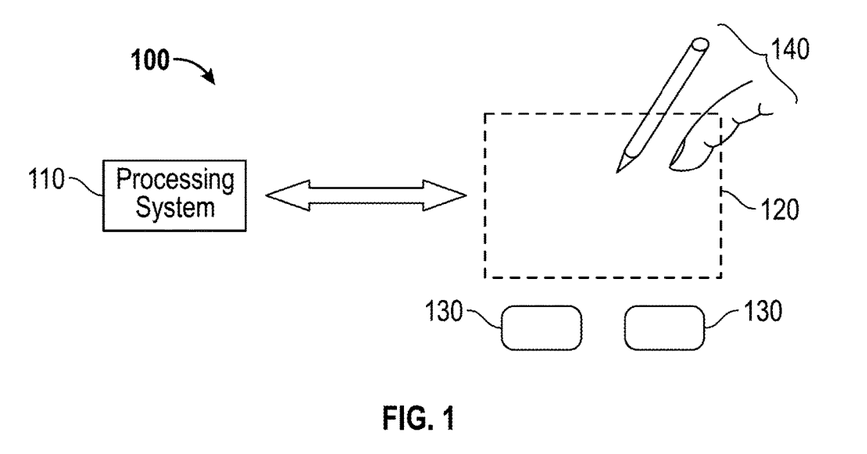
FIG. 1 is a block diagram of an exemplary electronic system that includes an input device and a processing system in accordance with an embodiment.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In a preferred embodiment, the input device 100 is implemented as a force enabled touchpad system including a processing system 110 and a sensing region 120. Sensing region 120 (also often referred to as "touchpad" or "touch sensor device") is configured to sense input provided by one or more input objects 140 in the sensing region 120. Example input objects include fingers, thumb, palm, and styli. The sensing region 120 is illustrated schematically as a rectangle; however, it should be understood that the sensing region may be of any convenient form and in any desired arrangement on the surface of and/or otherwise integrated with the touchpad.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device is adapted to provide user interface functionality by facilitating data entry responsive to the position of sensed objects and the force applied by such objects. Specifically, the processing system is configured to determine positional information for objects sensed by a sensor in the sensing region. This positional information can then be used by the system to provide a wide range of user interface functionality. Furthermore, the processing system is configured to determine force information for objects from measures of force determined by the sensor in the sensing region. This force information can then also be used by the system to provide a wide range of user interface functionality, for example, by providing different user interface functions in response to different levels of applied force by objects in the sensing region.

Furthermore, the processing system may be configured to determine input information for more than one object sensed in the sensing region. Input information can be based upon a combination the force information, the positional information, the number of input objects in the sensing region and/or in contact with the input surface, and a duration the one or more input objects is touching or in proximity to the input surface. Input information can then be used by the system to provide a wide range of user interface functionality.

The input device is sensitive to input by one or more input objects (e.g. fingers, styli, etc.), such as the position of an input object within the sensing region. The sensing region encompasses any space above, around, in and/or near the input device in which the input device is able to detect user input (e.g., user input provided by one or more input objects). The sizes, shapes, and locations of particular sensing regions may vary widely from embodiment to embodiment. In some embodiments, the sensing region extends from a surface of the input device in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device, contact with an input surface (e.g. a touch surface) of the input device, contact with an input surface of the input device coupled with some amount of applied force, and/or a combination thereof. In various embodiments, input surfaces may be provided by surfaces of casings within which the sensor electrodes reside, by face sheets applied over the sensor electrodes or any casings.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In various embodiments, the input device further comprises one or more force sensors as part of an interface for an electronic system. The input device has a processing system, an input surface, sensing region and a single or multiple force sensors implemented proximate the sensing region. Furthermore, it should be noted that one or more force sensors may be provided inside or outside the perimeter of the input surface. The input device uses both the proximity sensor and the force sensor(s) to provide an interface for an electronic system.

It should also be understood that the input device may be implemented with a variety of different methods to determine force imparted onto the input surface of the input device. For example, the input device may include mechanisms disposed proximate the input surface and configured to provide an electrical signal representative of an absolute or a change in force applied onto the input surface. In some embodiments, the input device may be configured to determine force information based on a defection of the input surface relative to a conductor (e.g. a display screen underlying the input surface). In some embodiments, the input surface may be configured to deflect about one or multiple axis. In some embodiments, the input surface may be configured to deflect in a substantially uniform or non-uniform manner. In various embodiments, the force sensors may be based on changes in capacitance and/or changes in resistance.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes).

In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit.

As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists).

In some embodiments, some part of the electronic system processes information received from the processing system 110 to act on user input, such as to facilitate a full range of actions, including mode changing actions and GUI actions. The types of actions may include, but are not limited to, pointing, tapping, selecting, clicking, double clicking, panning, zooming, and scrolling. Other examples of possible actions include an initiation and/or rate or speed of an action, such as a click, scroll, zoom, or pan.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning.

As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Likewise, the term "force information" as used herein is intended to broadly encompass force information regardless of format. For example, the force information can be provided for each input object as a vector or scalar quantity. As another example, the force information can be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

Likewise, the term "input information" as used herein is intended to broadly encompass temporal, positional and force information regardless of format, for any number of input objects. In some embodiments, input information may be determined for individual input objects. In other embodiments, input information comprises the number of input objects interacting with the input device.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110).

Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

As noted above, the embodiments of the invention can be implemented with a variety of different types and arrangements of capacitive sensor electrodes. To name several examples, the input device can be implemented with electrode arrays that are formed on multiple substrate layers, typically with the electrodes for sensing in one direction (e.g., the "X" direction) formed on a first layer, while the electrodes for sensing in a second direction (e.g., the "Y" direction are formed on a second layer. In other embodiments, the sensor electrodes for both the X and Y sensing can be formed on the same layer. In yet other embodiments, the sensor electrodes can be arranged for sensing in only one direction, e.g., in either the X or the Y direction.

In still another embodiment, the sensor electrodes can be arranged to provide positional information in polar coordinates, such as "r" and "θ" as one example. In these embodiments the sensor electrodes themselves are commonly arranged in a circle or other looped shape to provide "θ", with the shapes of individual sensor electrodes used to provide "r".

Also, a variety of different sensor electrode shapes can be used, including electrodes shaped as thin lines, rectangles, diamonds, wedge, etc. Finally, a variety of conductive materials and fabrication techniques can be used to form the sensor electrodes. As one example, the sensor electrodes are formed by the deposition and etching of conductive ink on a substrate.

Figure 2:
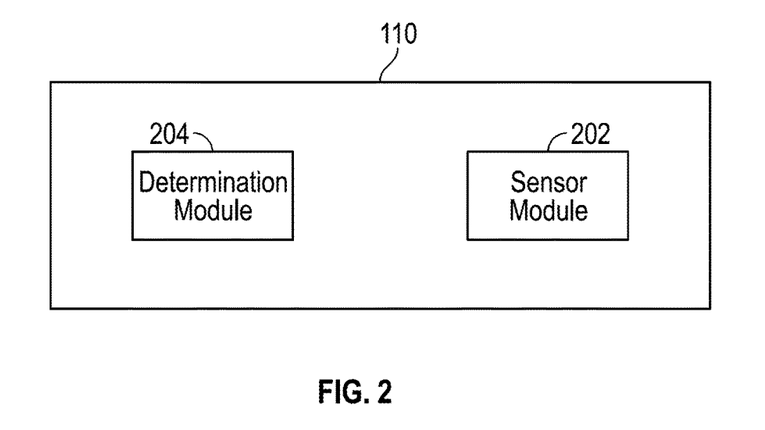
FIG. 2 is a schematic view of an exemplary processing system in accordance with an embodiment.

Referring now to FIGS. 1 and 2, the processing system 110 includes a sensor module 202 and a determination module 204. Sensor module 202 is configured to receive resulting signals from the sensor electrodes associated with sensing region 120. Determination module 204 is configured to process the data, and to determine positional information and the force information for one or more input objects in the sensing region.

Figure 3:
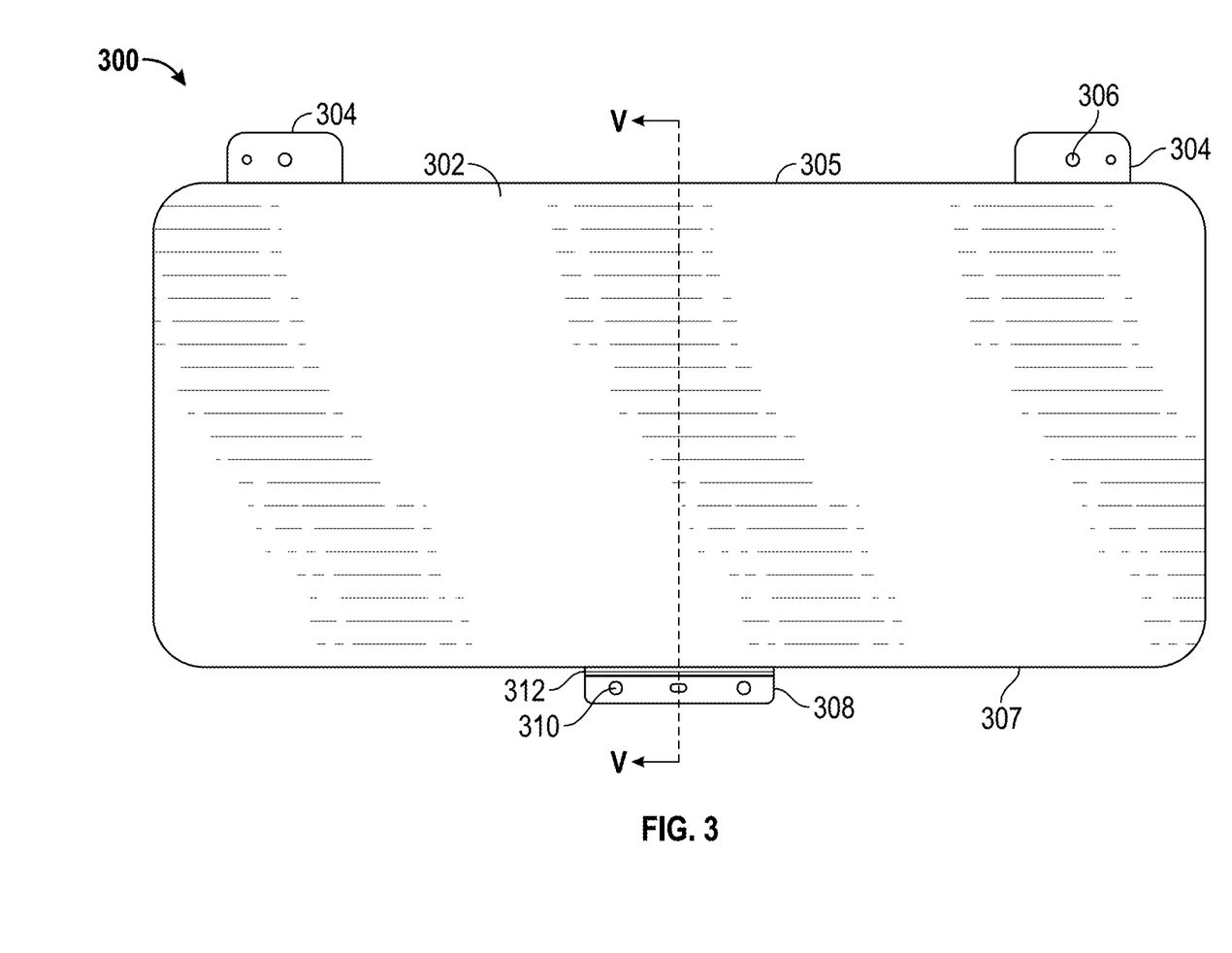
FIG. 3 is a top plan view of a hinged input device made from a single piece of material in accordance with an embodiment.

Referring now to FIG. 3 a hinged input device 300 is shown. More particularly, input device 300 includes a stiffener plate 302, hinges 304, and return mechanism 308. The stiffener plate 302 may be adhered to and thereby support the proximity sensor substrate, such as a glass reinforced epoxy laminate (FR4) or polyethylene terephthalate (PET) circuit board (not shown). In an embodiment, the stiffener plate 302, hinges 304, and return mechanism 308 are made from a single piece of material, for example, a stamped metallic sheet. Alternatively, the hinges 304 and stiffener 302 may be of unitary construction, with the return mechanism 308 fastened to the stiffener plate 302.

Hinges 304 are located along a first edge 305 of the stiffener plate 302, and include holes 306 for fastening the input device 300 to the chassis of the electronic system with which the input device is used. The return mechanism 308 is located along a second edge 307 of the stiffener plate 302, and includes holes 310 for fastening the return mechanism to the chassis, and a leaf spring 312 which extends underneath a portion of the stiffener plate 302. Significantly, the return mechanism 308 is spaced apart from the hinges 304. In the illustrated embodiment, the return mechanism 308 is disposed opposite the hinges 304. Alternatively, one or more return mechanisms may be placed at any location along the perimeter of the stiffener plate 302.

Figure 4:
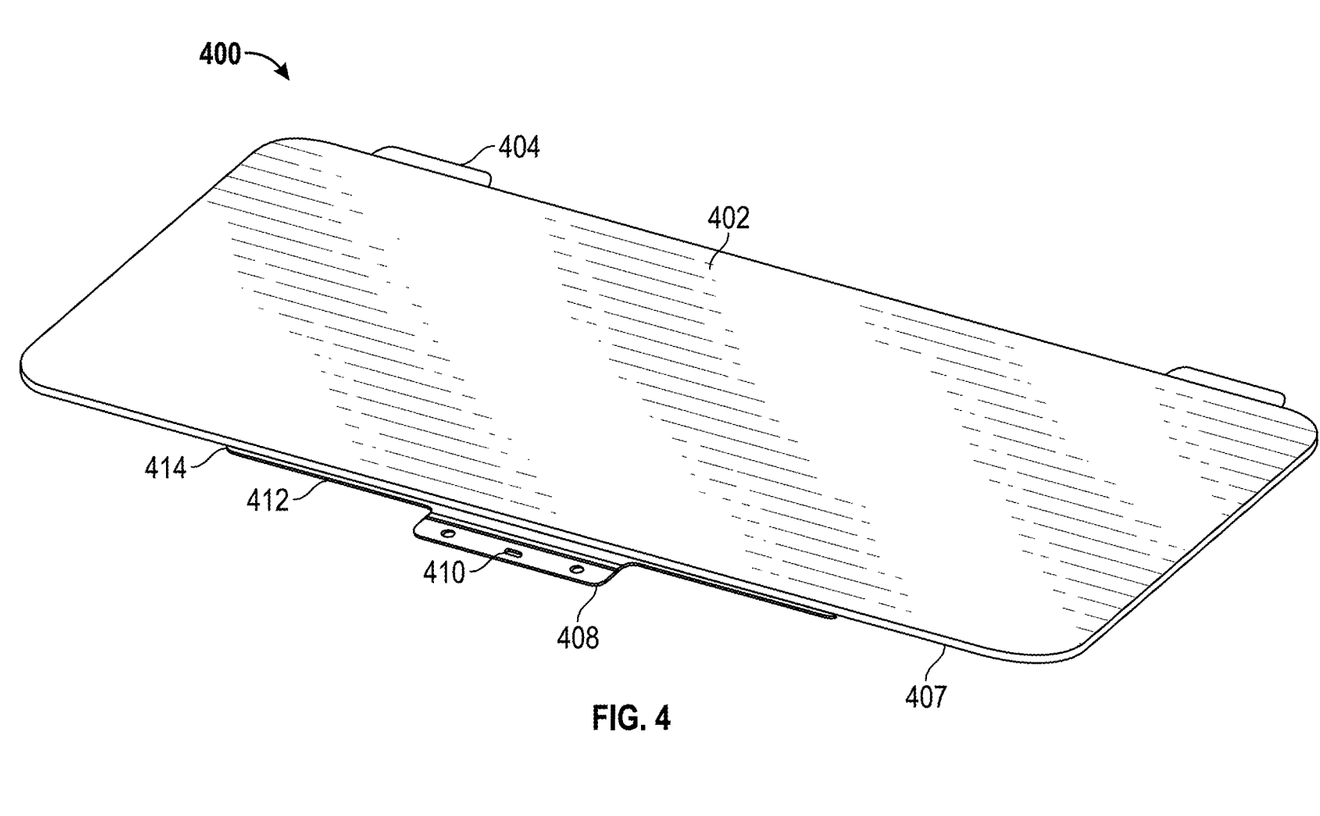
FIG. 4 is a perspective view of the hinged input device of FIG. 3 showing the leaf spring in accordance with an embodiment.

FIG. 4 is a perspective view of a hinged input device 400 similar to that shown in FIG. 3. More particularly, the input device 400 includes a stiffener 402, hinges 404, and a return mechanism 408 including a leaf spring 412 having a raised or embossed portion 414. When installed into an electronic system, the hinges 404 and return mechanism 408 are secured to the chassis in any suitable manner, such as through holes 410. When a user presses down on the surface of stiffener 402 (either directly or onto an intervening lens, face plate, or the like), the input device 400 pivots about the hinges 404, and the edge 407 to which the return mechanism is connected swings downwardly. As edge 407 swings downwardly, energy is stored in the leaf spring 412 as stiffener 402 moves relative to the portion (e.g., holes 410) of the return mechanism 408 mounted to the chassis.

Typically, the user presses down until a tach switch or other motion or position detector (not shown in FIG. 4) is actuated, simulating a button press. When the user lifts off the input surface, the energy stored in the return mechanism 408 restores the input device 400 to its original position. Significantly, placing the return mechanism 408 along edge 407 distal from the hinges 404 reduces or eliminates the need for the hinges to restore the device to its nominal position following a button press, thereby reducing or eliminating the cyclic fatigue on the hinges, which is particularly advantageous over a large number of button press cycles.

Figure 5:
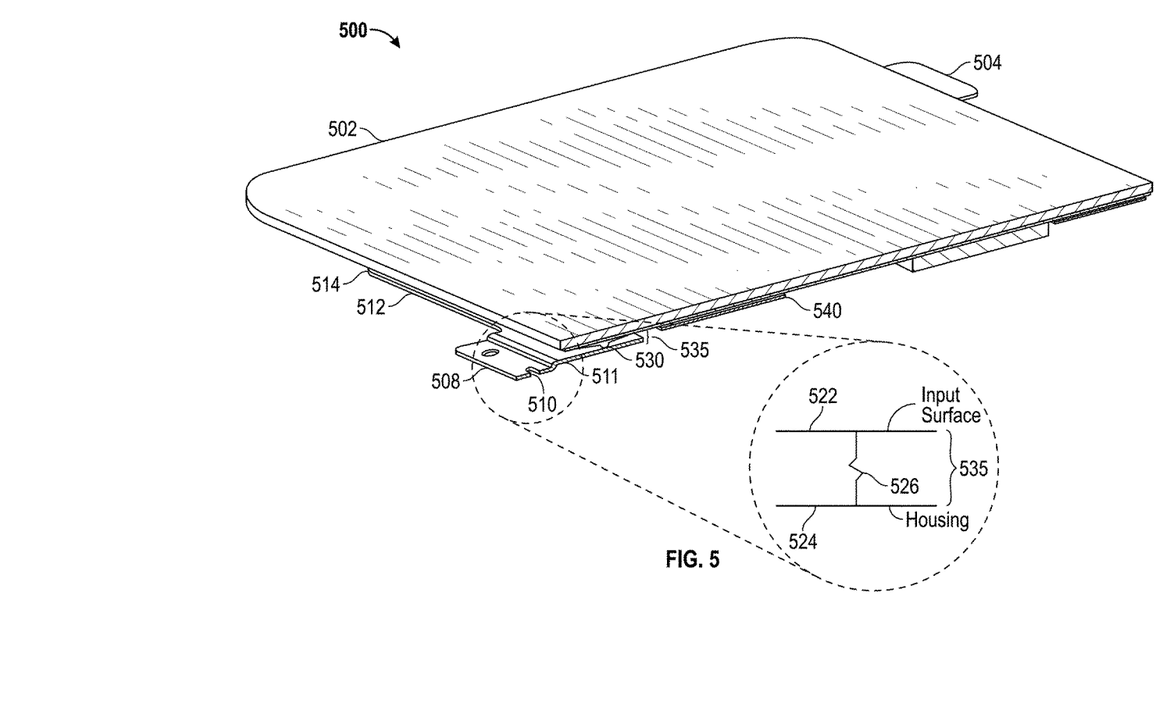
FIG. 5 is a cross-section view of the hinged input device taken along line V-V of FIG. 3 in accordance with an embodiment.

FIG. 5 is a cross-section view of the hinged input device taken along line V-V of FIG. 3. More particularly, the input device 500 includes a stiffener 502, a hinge 504, and a return mechanism 508. The return mechanism 508 includes a leaf spring 512, an embossed portion 514 connected to the underside of the stiffener 502, and one or more fasteners (e.g., holes) 508 for securing the return mechanism 508 to the chassis of the electronic system. A circuit board (or film) 540 is secured to the underside of the stiffener 502. The circuit board 540 includes a switch 530 for detecting contact, position, or movement of the circuit board 540 relative to the return mechanism 508. Alternatively, the switch 530 may be configured to detect contact, position, or movement of the circuit board 540 relative to the chassis. In particular, when the user presses down on the input surface, a gap 535 between the switch 530 and a top surface 511 of the return mechanism 510 closes, resulting in actuation of the switch 530 and thereby simulating a button press.

With continued reference to FIG. 5, a schematic diagram 560 represents the function of the spring mechanism 508. Specifically, the spring mechanism 508 may be modeled as a compression, tension, leaf, or other suitable spring system, wherein a spring 526 stores energy as the gap 535 is closed by the user applying pressure to the device, until the gap between the input surface 522 and the chassis 524 is closed or substantially closed. When the user lifts off, the energy stored in the spring 526 is released, thereby restoring the device to its nominal position.

Figure 6:
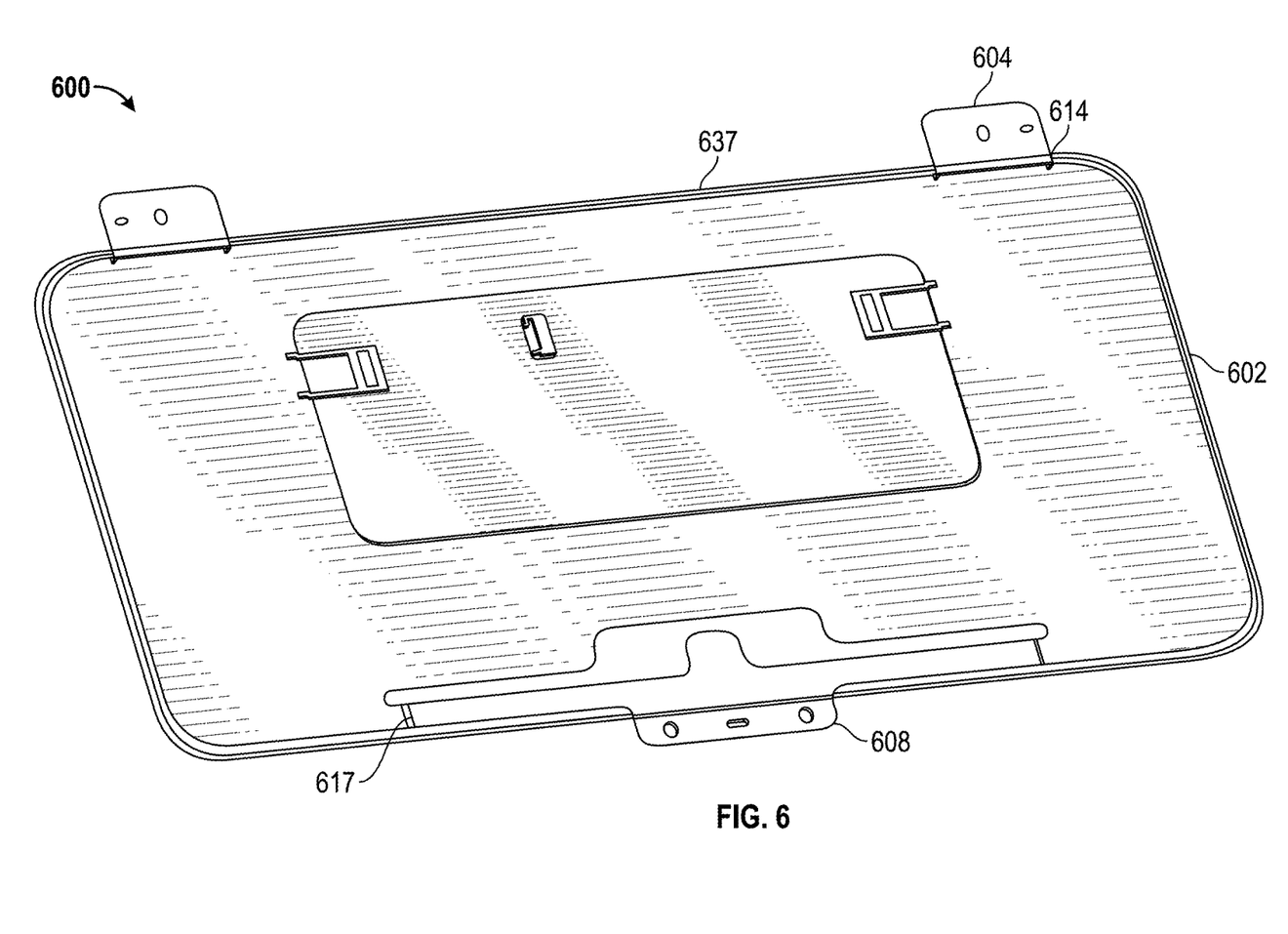
FIG. 6 is a perspective view of an alternative implementation of a hinged input device made from multiple pieces of material in accordance with an embodiment.

FIG. 6 is a perspective view of a hinged input device 600 made from multiple pieces of material in accordance with an alternate embodiment. More particularly, the input device 600 includes a stiffener 602 having a cutout portion 632, hinges 604, and a return mechanism 608 having a spring 612, in the alternate embodiment shown in FIG. 6, one or more of the hinges 604 may be passively connected to the stiffener 602 by a rod assembly 614, such that the hinge 604 undergoes little or no flexure as the user presses down on the input surface. In addition, the return mechanism 608 may be integral with or fastened to the stiffener, as desired.

Figure 7:
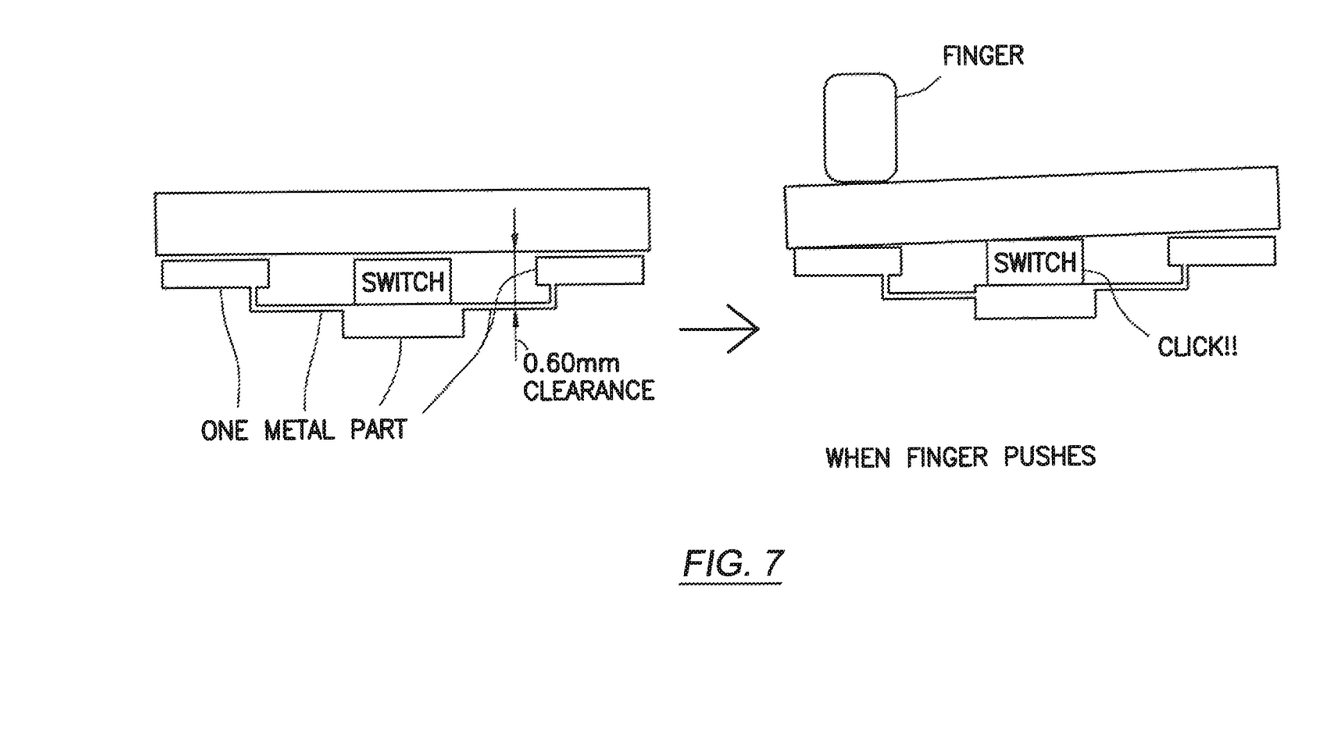
FIG. 7 illustrates various perspective views of a hinged input device in accordance with one or more embodiments.

FIG. 7 illustrates the hinged clickable input device when it is not being "clicked" and when it is being "clicked" or depressed by an input object. As is illustrated, the support mechanism providing the hinge and the depressible area (i.e., clickable area or input area/region) may be provided by a single piece. When an input object depresses an input region (i.e., a button region), the clickable input device pivots down on the end opposite the hinge, activating the switch.

Figure 8:
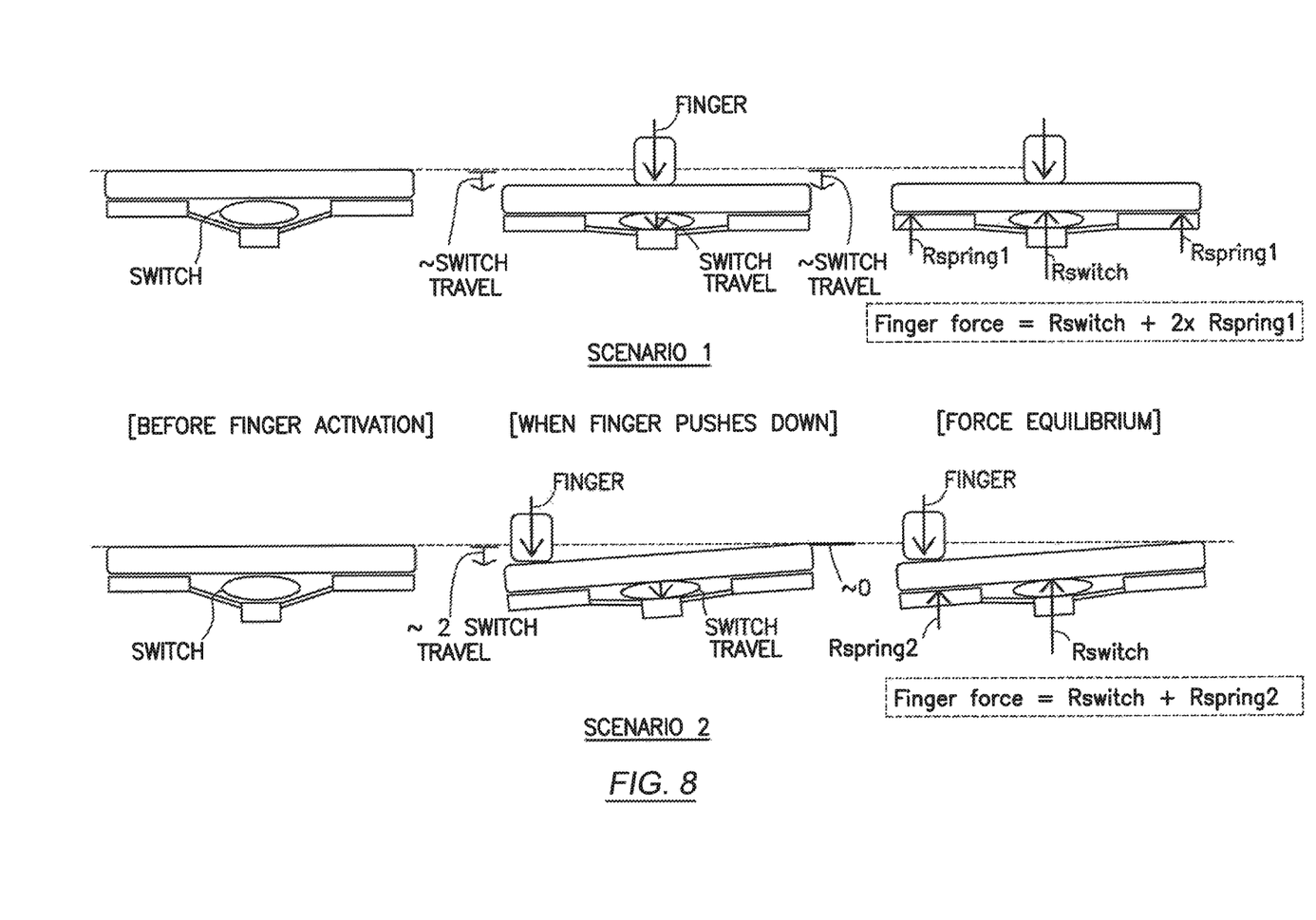
FIG. 8 illustrates various perspective views of a hinged input device in accordance with one or more embodiments.

FIG. 8 illustrates a first and second input scenario for the clickable input device. In the first scenario, an input object applies force proximate the center of the clickable input device, and as the input force threshold is met, the clickable input device depresses, activating the switch. In such a scenario, finger force (input object force) is equal to the resistant force of the switch and twice the resistant force of the spring. In the second scenario, an input object applies force proximate an edge of the clickable input device, and as the input force threshold is met, the clickable input device depresses, activating the switch. In such a scenario, finger force (input object force) is equal to the resistant force of the switch and the resistant force of the spring. Further, the displacement for the two cantilevers for scenario 1 is substantially equal to the switch travel and in scenario 2, the displacement for the cantilever proximate the input object is about twice the switch travel while the other cantilever, opposite the input object is substantially zero and acting like a pivot. Based on this, the force resistant of the spring in the second scenario (Rspring2) should be proximately two times the force resistant of the spring first scenario (Rspring1). As such, this will provide a substantially equivalent input force response.

In one or more embodiments, a support, a spring, a switch actuation plane, and a fixation plane may all be a part a single support mechanism. Further, the support, spring, switch actuation plane and the fixation plane may be formed for a single piece of material. Further the hinge area may be formed from the support mechanism and may also be formed from the single piece of material that is used to form the support, spring, switch actuation plane and the fixation plane.

Finally, one or more of the spring mechanism, the stiffener, and the hinge may be configured to provide an electrostatic discharge (ESD) path from the sensor to the chassis of the electronic system.

An input device for use with an electronic system is thus provided which includes a deflectable component having an input surface configured to be touched by input objects and a capacitive sensor layer configured to sense positional information of the input objects; a hinge configured to pivotably mount a first edge of the deflectable component to the electronic system and to facilitate deflection of the deflectable component in response to force applied by an input object to the input surface; and a spring mechanism spaced apart from the hinge, the spring mechanism configured to resiliently couple a second edge of the deflectable component to the electronic system and to provide a restoring force responsive to the applied force.

In an embodiment, the spring mechanism and the hinge may be formed from a single piece of material, and the deflectable component may include a stiffener coupled to the capacitive sensor layer.

In one embodiment, the stiffener and the hinge are formed from a single piece of material. In another embodiment the stiffener and the spring mechanism are formed from a single piece of material. In yet a further embodiment, the spring mechanism, the stiffener, and the hinge are formed from a single piece of material.

In another embodiment, at least one of the spring mechanism and the hinge is coupled to a chassis associated with the electronic system by one of: screws; adhesive; riveting; crimping; and swaging.

In another embodiment, at least one of the spring mechanism, the stiffener, and the hinge comprises an electrostatic discharge (ESD) path for the input device.

In a further embodiment, the spring mechanism is adjacent to the deflectable component, and the spring mechanism and the deflectable component have a combined thickness in the range of about 0.5 millimeters (mm) to about 2.5 mm.

In yet a further embodiment, the second edge is disposed opposite the first edge.

In another embodiment, the spring mechanism is substantially planar and includes at least one of an embossed segment and a leaf spring.

In another embodiment, the hinge is configured to provide a restoring force responsive to the applied force. Alternatively, the hinge may not be configured to provide a restoring force responsive to the applied force.

In an embodiment, the input device also includes an actuation element configured to detect deflection of the deflectable component, wherein the actuation element may be mounted to the electronic system proximate the second edge of the deflectable component.

In another embodiment, the capacitive sensor layer may be an FR4 composite circuit board or a sheet of polyethelyne terephthalate (PET), and the actuation element may be mounted to the capacitive sensor layer.

In a further embodiment the actuation element comprises at least one of: a mechanical switch; an electronic switch; a resistive sensor; a capacitive sensor; a contact switch; a haptic sensor; a piezoelectric switch; a force sensor; a proximity switch; and a proximity sensor.

In another embodiment, the input device includes a processing system communicatively coupled to the actuation element and the capacitive sensor layer, where the processing system is configured to determine positional information for the input objects and deflection of the deflectable component.

An input device is also provided which includes a deflectable component including a proximity sensor configured to sense positional information for an input object; a hinge configured to pivotably mount a first edge of the deflectable component to a chassis of an electronic system and to facilitate deflection of the deflectable component in response to force applied by the input object to the cover layer; a spring mechanism configured to resiliently couple a second edge of the deflectable component to the chassis and to provide a restoring force responsive to the applied force; and a processing system configured to determine positional information for the input objects and deflection of the deflectable component.

Finally, an input device is provided which includes a deflectable component including a proximity sensor configured to sense positional information for an input object; a hinge configured to pivotably mount a first edge of the deflectable component to a chassis of an electronic system and to facilitate deflection of the deflectable component in response to force applied by the input object to the cover layer; a spring mechanism configured to resiliently couple a second edge of the deflectable component to the chassis and to provide a restoring force responsive to the applied force, the second edge being disposed opposite the first edge; an actuation element mounted to the electronic system proximate the second edge of the deflectable component and configured to detect deflection of the deflectable component; and a processing system communicatively coupled to the actuation element and the proximity sensor, the processing system configured to determine positional information for the input objects and deflection of the deflectable component.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Other embodiments, uses, and advantages of the invention will be apparent to those skilled in art from the specification and the practice of the disclosed invention.

What is claimed is:

1. An input device for use with an electronic system, comprising:
    a housing;
    a deflectable planar component including a single piece of material that comprises a leaf spring and an actuation plate, an input surface configured to be touched by input objects, and a capacitive sensor layer configured to sense positional information of the input objects;
    a first hinge and a second hinge pivotably mounting a first edge of the deflectable planar component to the electronic system and configured to facilitate deflection of the deflectable planar component in response to a force applied by an input object to the input surface,
        wherein the leaf spring of the single piece of material is spaced apart from the first hinge and the second hinge, and is disposed inside the deflectable planar component along a second edge of the deflectable planar component, the second edge of the deflectable planar component coupling the electronic system,
        wherein the leaf spring of the single piece of material provides a first restoring force and a second restoring force proximate the second edge of the deflectable planar component in response to the applied force, and
        wherein the first edge of the deflectable planar component is opposite the second edge of the deflectable planar component; and
    an actuation element disposed between the deflectable planar component and the housing and a gap is formed between the actuation element and the actuation plate of the single piece of material,
    wherein the actuation element is disposed between the first restoring force of the leaf spring of the single piece of material and the second restoring force of the leaf spring of the single piece of material, and
    wherein the actuation element actuates and deflection is detected when the actuation plate of the single piece of material contacts the actuation element.

2. The input device of claim 1, wherein the single piece of material further comprises the first hinge and the second hinge.

3. The input device of claim 1, wherein the deflectable planar component further comprises a stiffener coupled to the capacitive sensor layer.

4. The input device of claim 3, wherein the single piece of material further comprises the stiffener, the first hinge, and the second hinge.

5. The input device of claim 1, wherein at least one of the single piece of material, the first hinge, and the second hinge is coupled to a chassis associated with the electronic system by one of: screws; adhesive; riveting; crimping; and swaging.

6. The input device of claim 3, wherein at least one of the single piece of material, the stiffener, the first hinge, and the second hinge comprises an electrostatic discharge (ESD) path for the input device.

7. The input device of claim 3, wherein the deflectable planar component has a combined thickness in the range of about 0.5 millimeters (mm) to about 2.5 mm.

8. The input device of claim 1, wherein the single piece of material is substantially planar and includes an embossed segment.

9. The input device of claim 1, wherein the first hinge and the second hinge provide a restoring force responsive to the applied force.

10. The input device of claim 1, wherein the actuation element is mounted to the electronic system proximate the second edge of the deflectable planar component.

11. The input device of claim 1, wherein:
    the capacitive sensor layer comprises one of: a circuit board; and a sheet of polyethylene terephthalate (PET).

12. The input device of claim 1, wherein the actuation element comprises a mechanical switch.

13. The input device of claim 1, further comprising a processing system communicatively coupled to the actuation element and the capacitive sensor layer, the processing system configured to operate the capacitive sensor layer to determine positional information for the input objects and to operate the actuation element to detect the deflection of the deflectable planar component.

14. An input device comprising:
    a housing;
    a deflectable planar component including a single piece of material that comprises a leaf spring and an actuation plate, and a proximity sensor configured to sense positional information for an input object;
    a first hinge and a second hinge pivotably mounting a first edge of the deflectable planar component to a chassis of an electronic system and configured to facilitate deflection of the deflectable planar component in response to a force applied by the input object to a cover layer,
        wherein the leaf spring of the single piece of material is spaced apart from the first hinge and the second hinge, and is disposed inside the deflectable planar component along a second edge of the deflectable planar component, the second edge of the deflectable planar component coupling the chassis,
        wherein the leaf spring provides a first restoring force and a second restoring force proximate the second edge of the deflectable planar component in response to the applied force, and
        wherein the first edge of the deflectable planar component is opposite the second edge of the deflectable planar component;
    an actuation element disposed between the deflectable planar component and housing, and a gap is formed between the actuation element and the actuation plate of the single piece of material,
    wherein the actuation element is disposed between the first restoring force of the leaf spring and the second restoring force of the leaf spring, and
    wherein the actuation element actuates and the deflection of the deflectable planar component is detected when the actuation plate of the single piece of material contacts the actuation element; and
    a processing system configured to determine positional information for the input objects and the deflection.

15. An input device comprising:
    a housing;
    a deflectable planar component including a single piece of material that comprises a leaf spring and an actuation plate, a proximity sensor configured to sense positional information for an input object;
    a first hinge and a second hinge pivotably mounting a first edge of the deflectable component to a chassis of an electronic system and configured to facilitate deflection of the deflectable planar component in response to a force applied by the input object to a cover layer, wherein the leaf spring of the single piece of material is spaced apart from the first hinge and the second hinge, and is disposed inside the deflectable component along a second edge of the deflectable planar component, the second edge of the deflectable planar component coupling the chassis, and wherein the leaf spring of the single piece of material provides a first restoring force and a second restoring force proximate the second edge of the deflectable planar component in response to the applied force, the second edge of the deflectable planar component is opposite the first edge of the deflectable planar component;

an actuation element disposed between the deflectable planar component and the housing, and a gap is formed between the actuation element and the actuation plate of the single piece of material, wherein the actuation element is disposed between the first restoring force of the leaf spring of the single piece of material and the second restoring force of the leaf spring of the single piece of material, and wherein the actuation element actuates and the deflection of the deflectable planar component is detected when the actuation plate of the single piece of material contacts the actuation element; and a processing system communicatively coupled to the actuation element and the proximity sensor, the processing system configured to determine positional information for the input objects and the deflection of the deflectable planar component.

16. The input device of claim 14, wherein the single piece of material further comprises the first hinge and the second hinge.

17. The input device of claim 14, wherein at least one of the single piece of material, the first hinge, and the second hinge comprises an electrostatic discharge (ESD) path for the input device.

18. The input device of claim 14, wherein:
the capacitive sensor layer comprises one of: a circuit board; and a sheet of polyethylene terephthalate (PET).

19. The input device of claim 14, wherein the actuation element comprises a mechanical switch.

\* \* \* \* \*

UNITED STATES PATENT AND TRADEMARK OFFICE
CERTIFICATE OF CORRECTION

PATENT NO. : 9,921,692 B2
APPLICATION NO. : 13/931682
DATED : March 20, 2018
INVENTOR(S) : Yeh-Cheng Tan et al.

Page 1 of 1

It is certified that error appears in the above-identified patent and that said Letters Patent is hereby corrected as shown below:

In the Claims

Claim 1, Column 13, Line 34, the line reads "...planar component and the housing and a gap is formed...", but should read -- ...planar component and the housing, and a gap is formed... --.

Signed and Sealed this
Fourth Day of June, 2019

Andrei Iancu
*Director of the United States Patent and Trademark Office*